United States Patent [19]

Fork

[11] 3,886,702
[45] June 3, 1975

[54] METAL CELLULAR FLOORING UNIT FOR BOTTOMLESS ELECTRICAL CABLE TRENCH

[75] Inventor: Frank W. Fork, Allison Park, Pa.

[73] Assignee: H. H. Robertson Company, Pittsburgh, Pa.

[22] Filed: July 17, 1974

[21] Appl. No.: 489,173

Related U.S. Application Data

[63] Continuation-in-part of Ser. No. 342,478, March 19, 1973, abandoned, which is a continuation-in-part of Ser. No. 158,769, July 1, 1971, Pat. No. 3,721,051.

[52] U.S. Cl. .................. 52/221; 174/49; 174/96; 220/3.4
[51] Int. Cl. .................. E04b 5/46; E04f 17/08
[58] Field of Search ........ 52/173, 220, 221; 174/48, 174/49, 97, 96; 220/3.4

[56] References Cited
UNITED STATES PATENTS

| | | | |
|---|---|---|---|
| 2,073,490 | 3/1937 | Lewin | 52/221 |
| 2,946,413 | 7/1960 | Wiesman | 52/221 X |
| 3,303,264 | 2/1967 | Saul et al. | 52/221 X |
| 3,417,191 | 12/1968 | Fork | 52/221 X |
| 3,420,018 | 1/1969 | Fork | 52/221 |
| 3,426,492 | 2/1969 | Fork | 52/221 |
| 3,453,791 | 7/1969 | Fork | 52/221 |
| 3,459,875 | 8/1969 | Fork | 52/221 X |
| 3,494,651 | 2/1970 | Fork et al. | 52/221 |
| 3,577,863 | 5/1971 | Hudnall | 52/220 |
| 3,592,956 | 7/1971 | Fork | 52/221 X |
| 3,609,210 | 9/1971 | Guritz | 52/221 X |
| 3,676,568 | 7/1972 | Fork | 52/221 X |
| 3,701,837 | 10/1972 | Fork | 52/221 X |
| 3,715,844 | 2/1973 | Breading | 52/221 |
| 3,721,051 | 3/1973 | Fork | 52/173 |

*Primary Examiner*—John E. Murtagh
*Assistant Examiner*—Leslie A. Braun
*Attorney, Agent, or Firm*—Harry B. Keck; George E. Manias

[57] ABSTRACT

A metal cellular flooring unit having a novel access opening arrangement which affords adequate access to the interior of the flooring unit cells. In the present arrangement, the crest of one cell is provided with a crest access opening, and one or both of the webs of one or all other cells is provided with a web access opening. The metal cellular flooring units of this invention may be intermixed with non-cellular flooring units to provide a metal subfloor, over which a bottomless electrical cable trench-forming assembly is applied. The crest access openings and the web access openings of selected flooring units are presented within the confines of the trench-forming assembly.

21 Claims, 8 Drawing Figures

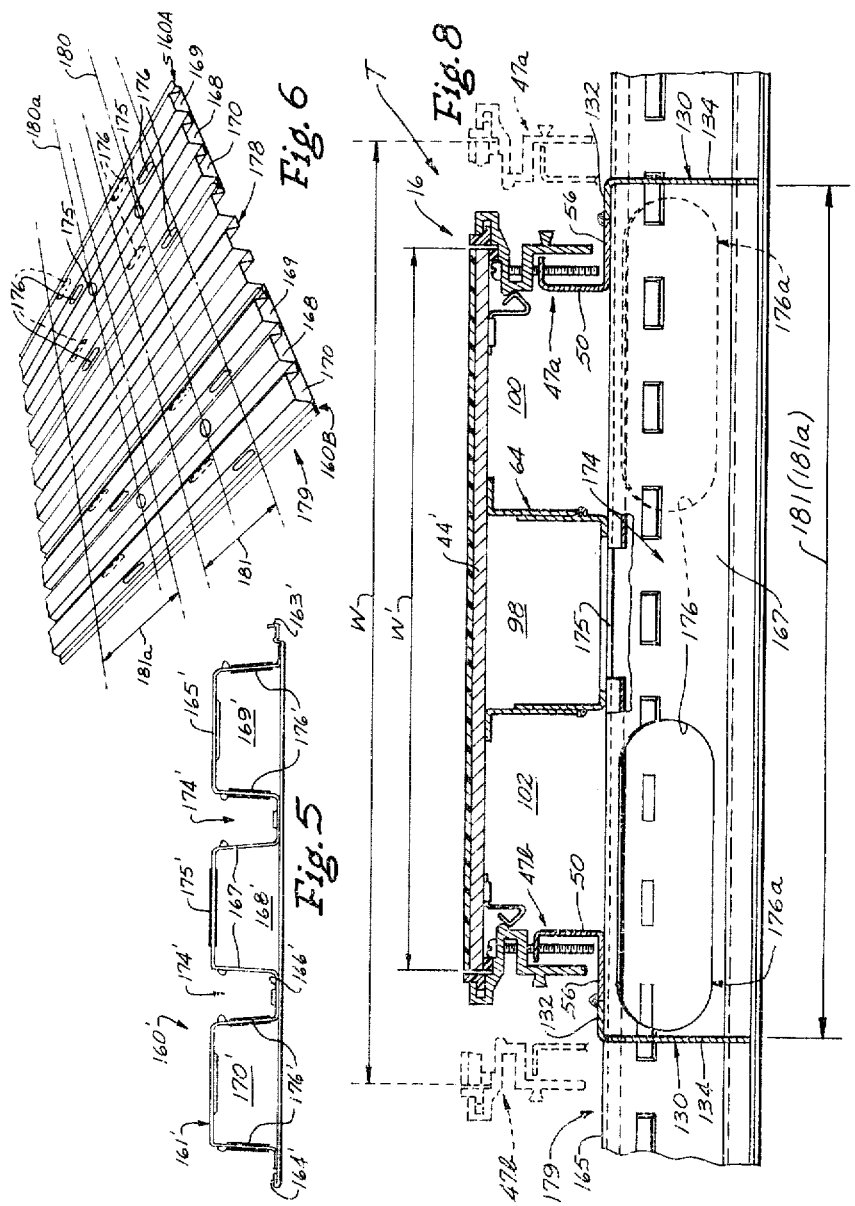

METAL CELLULAR FLOORING UNIT FOR BOTTOMLESS ELECTRICAL CABLE TRENCH

CROSS-REFERENCES TO RELATED APPLICATIONS

This application is a continuation-in-part of copending application Ser. No. 342,478 filed Mar. 19, 1973, now abandoned, which is a continuation-in-part of a copending application Ser. No. 158,769 filed July 1, 1971, now U.S. Pat. No. 3,721,051, and assigned to the assignee of this invention.

BACKGROUND OF THE INVENTION

Field of the Invention

This invention relates to metal cellular flooring, and more particularly to metal cellular flooring useful in combination with a bottomless trench-forming electrical cable trench for the distribution of electrical wiring.

2. Description of the Prior Art

The prior art includes many examples of metal cellular flooring units having plural access openings arranged to provide communication between the flooring unit cells and the space above the flooring unit. The access openings have been provided in the crests of the flooring unit, see U.S. Pat. Nos. 2,073,490 (LEWIN, March 1937); 3,303,264 (SAUL et al. February 1967); 3,453,791 (FORK, July 1969); 3,592,956 (FORK, July 1971); 3,609,210 (GURITZ, September 1971); 3,676,568 (FORK, July 1972). The access openings of the above cited prior art flooring units are adapted for use in combination with dual outlet fittings, each presenting one or more outlet openings at the floor level through which communication is established to the interiors of adjacent cells.

Access openings also have been provided as opposed pairs in the opposed webs of the adjacent flooring unit cells, see U.S. Pat. Nos. 3,426,492 (FORK, February 1969); 3,426,802 (FORK, February 1969). The opposed access openings of the FORK U.S. Pat. Nos. 3,426,492 and 3,426,802 are particularly adapted to receive the dual outlet fitting of U.S. Pat. No. 3,417,191 (FORK, December 1968).

SUMMARY OF THE INVENTION

The principal object of this invention is to provide a metal cellular flooring unit having a novel access opening arrangement.

Another object of this invention is to provide a metal cellular flooring unit presenting plural enclosed cells having access openings arranged to provide communication between the space above the unit and the interior of the cells, through the crest of one cell and through the web of at least one other cell.

A further object of this invention is to provide a metal cellular flooring unit adapted for use in combination with a bottomless electrical cable trench-forming sub-assembly housing an enclosed raceway.

Still another object of this invention is to provide a metal cellular flooring unit having a novel access opening arrangement which permits a significant reduction in the width of the cover plate employed in the trench-forming sub-assembly.

The present invention provides a metal cellular flooring unit of the type comprising a corrugated upper metal sheet and a correlative lower metal sheet secured to the upper metal sheet along contiguous portions thereof. The lower metal sheet cooperates with the corrugated upper metal sheet to define spaced-apart, generally parallel cells. Each cell is defined by a crest, depending webs, and that portion of a lower metal sheet extending between the webs.

In accordance with the present invention, the crest of a first cell is provided with a crest access opening which establishes communication between the interior of the first cell and the space above the flooring unit. At least one web of a second cell is provided with a web access opening which establishes communication between the interior of the second cell and the space above the valley which adjoins the web. An additional web access opening may be provided in the other web of the second cell as well as in each of the webs of a third cell.

Where the metal cellular flooring unit presents three cells, the crest access opening may be provided in the center cell and the web access openings are provided in the webs of the cells on opposite sides of the center cell. The web access openings of each cell may reside on opposite sides of the crest access opening. Alternatively, the web access openings may all reside to one side of the crest access opening.

The present metal cellular flooring unit is particularly adapted for use in combination with the bottomless electrical cable trench-forming sub-assembly and the enclosed raceway described and claimed in the aforesaid U.S. PAT. No. 3,721,051. The metal cellular flooring unit has a transverse region intermediate of its ends — the transverse region having a width which exceeds the width of the trench-forming sub-assembly by a small increment. As is well known, trench-forming sub-assemblies such as that described in U.S. Pat. No. 3,721,051 are provided in widths of from 9 inches to 36. At present, trench-forming sub-assemblies having widths of up to 48 inches are being considered. Thus the aforesaid transverse region may have a width of up to about 50 inches.

When the trench-forming sub-assembly is combined with the present metal cellular flooring unit, the crest access opening provides communication between the interior of one cell and the interior of the enclosed raceway; and the web access openings provide communication between the interiors of the other cells and the interior of the trench-forming sub-assembly other than the interior of the enclosed raceway. The web access openings and the crest access opening are presented within the confines of the trench-forming assembly and hence within the aforesaid transverse region.

The present access opening arrangement permits the width of the trench-forming sub-assembly to be reduced thereby achieving significant savings in the amount of material used in making the trench cover plates. Also, placement of certain access openings in the webs of the flooring unit permits the width of the enclosed raceway to be increased as desired without significantly impeding access to the web access openings and the interiors of the flooring unit cells presenting the web access openings.

BRIEF DESCRIPTION OF THE DRAWINGS

FIG. 5 is an end view illustrating another metal cellular flooring unit;

FIG. 6 is a fragmentary prospective view of a metal sub-floor incorporating the metal cellular flooring units of this invention;

FIG. 8 is a fragmentary cross-sectional view taken longitudinally of the present metal cellular flooring unit, illustrating the installed position of the bottomless electrical cable trench-forming sub-assembly.

DESCRIPTION OF THE PREFERRED EMBODIMENTS

Figure 1:
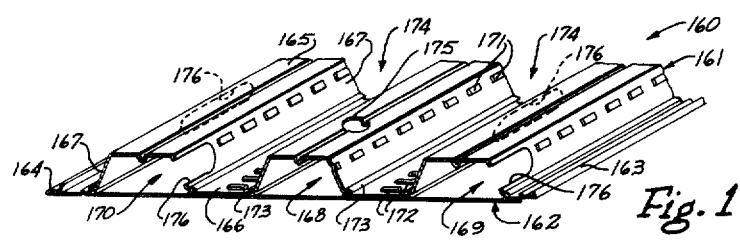
FIG. 1 is a fragmentary isometric view illustrating a metal cellular flooring unit according to this invention.
Figure 2:
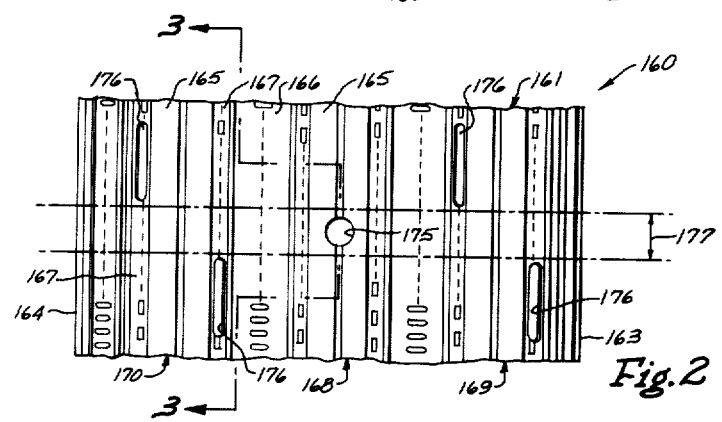
FIG 2 is a fragmentary plan view of the metal cellular flooring unit of FIG. 1.

FIGS. 1 and 2 illustrate a metal cellular flooring unit 160 comprising a corrugated upper metal sheet 161 and a correlative lower metal sheet 162 secured to the upper metal sheet 161 along contiguous portions thereof. The flooring unit 160 additionally presents marginal connecting means 163, 164 along the opposite longitudinal sides thereof adapting the flooring unit 160 for interconnection with other units.

The corrugated upper metal sheet 161 presents alternating crests 165 and valleys 166 and inclined webs 167 connecting adjacent ones of the crests 165 and the valleys 166. The lower metal sheet 162 cooperates with the corrugated upper metal sheet 161 to define spaced-apart generally parallel cells 168, 169 and 170. Each of the cells 168 to 170 is defined by a crest 165, two inclined webs 167 depending from the opposite sides of the crest 165 and that portion of the lower metal sheet 162 extending between the inclined webs 167.

The metal cellular flooring unit 160 presents three cells, that is, the central cell 168 and the two lateral cells 169, 170. The three-cell unit 160 is conveniently employed in distributing different electrical services, for example, the central cell 168 normally is employed to distribute high voltage power wiring, whereas the lateral cells 169, 170 are employed to distribute low voltage telephone wiring and special services wiring.

It will be observed in FIG. 1 that the metal cellular flooring unit 160 is provided with composite features, such as web deformations 171, valley deformations 172 and longitudinal ribs 173, which adapt the flooring unit 160 for composite coaction with an overlying layer of concrete. It will also be observed in FIG. 1 that the width of the crest 165 is substantially equal to that of the valleys 166. The inclination of the webs 167 is such that a relatively wide trough 174 is provided between adjacent cells 168, 169 and 168, 170.

The present invention is also applicable to metal cellular flooring units such as illustrated in FIG. 5, wherein corresponding elements are identified by primed numerals. It will be observed in FIG. 5 that the width of the crests 165' is greater than that of the valleys 166'. Moreover, the webs 167 are generally vertical, whereby narrower troughs 174' are presented between adjacent cells 168', 169' and 168', 170'.

THE PRESENT IMPROVEMENT

Figure 3:
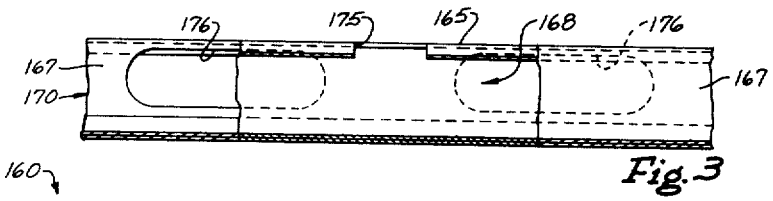
FIG. 3 is a cross-sectional view taken along the line 3—3 of FIG. 2.

Reference is now directly to FIGS. 1 through 3 of the drawings. In accordance with the present invention, the crest 165 of the central cell 168 is provided with a crest access opening 175 which establishes communication between the interior of the central cell 168 and the space above the floor unit 160. Further in accordance with the present invention, one or both of the webs 167 of one or both of the lateral cells 169, 170 is provided with a web access opening 176 which establishes communication between the interiors of the lateral cells 169, 170 and the space above the floor unit 160. The web access openings 176 preferably have a generally rectangular configuration thereby to facilitate insertion and withdrawal of electrical wiring. It will best be observed in FIGS. 2 and 3 that the web access openings 176 of each of the lateral cells 169, 170 reside on opposite sides of the crest access opening 175. The staggered or laterally offset relation of the web access openings 176 with respect to the crest access opening 175 provides a transverse region 177 of the flooring unit 160 which contains only the crest access opening 175. The significance of the transverse region 177 will become apparent later in the specification.

Figure 4:
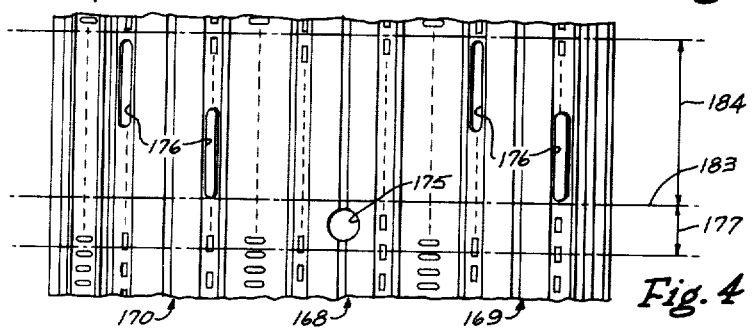
FIG. 4 is a fragmentary plan view similar to FIG. 2 illustrating an alternative access opening arrangement.

Alternatively, as shown in FIG. 4, the crest access opening 175 and the web access openings 176 reside on opposite sides of an imaginary line 183 which extends transversely of the flooring unit 160. The transverse region 177 of which the imaginary line 183 forms one boundary contains only the crest access opening 175. The web access openings 176 reside within a second transverse region 184 of which the imaginary line 183 forms one boundary.

The flooring unit 160' (FIG. 5) may also be provided with the present access opening arrangement. That is, the crest 165' of the central cell 168' is provided with a crest access opening 175'. One or both of the generally vertical webs 167' of one or both of the lateral cells 169', 170' may be provided with a web access opening 176' arranged in the manner described above.

Referring to FIG. 6, it will be observed that the metal cellular flooring unit 160 may be intermixed with a non-cellular flooring unit 178 (only one illustrated) to provide a metal subfloor 179. It will be observed in FIG. 6 that the crest access openings 175 of the flooring unit 160A, 160B are aligned along a center line 180 which extends perpendicular to the cells 168, 169 and 170. Thus arranged, the crest access openings 175 and the web access openings 176 are presented entirely within a transverse region 181 of the metal subfloor 179. It will also be observed in FIG. 6 that a transverse region 181a of the subfloor 179 is illustrated within which reside the crest access openings 175 and the web access openings 176 of the alternative arrangement of FIG. 4. The crest access openings 175 are aligned along a center line 180a which extends perpendicular to the cells 168, 169 and 170. The significance of the transverse regions 181 and 181a and the transverse regions 177 (FIG. 2) and 184 (FIG. 4) will now become apparent in the following description.

Figure 7:
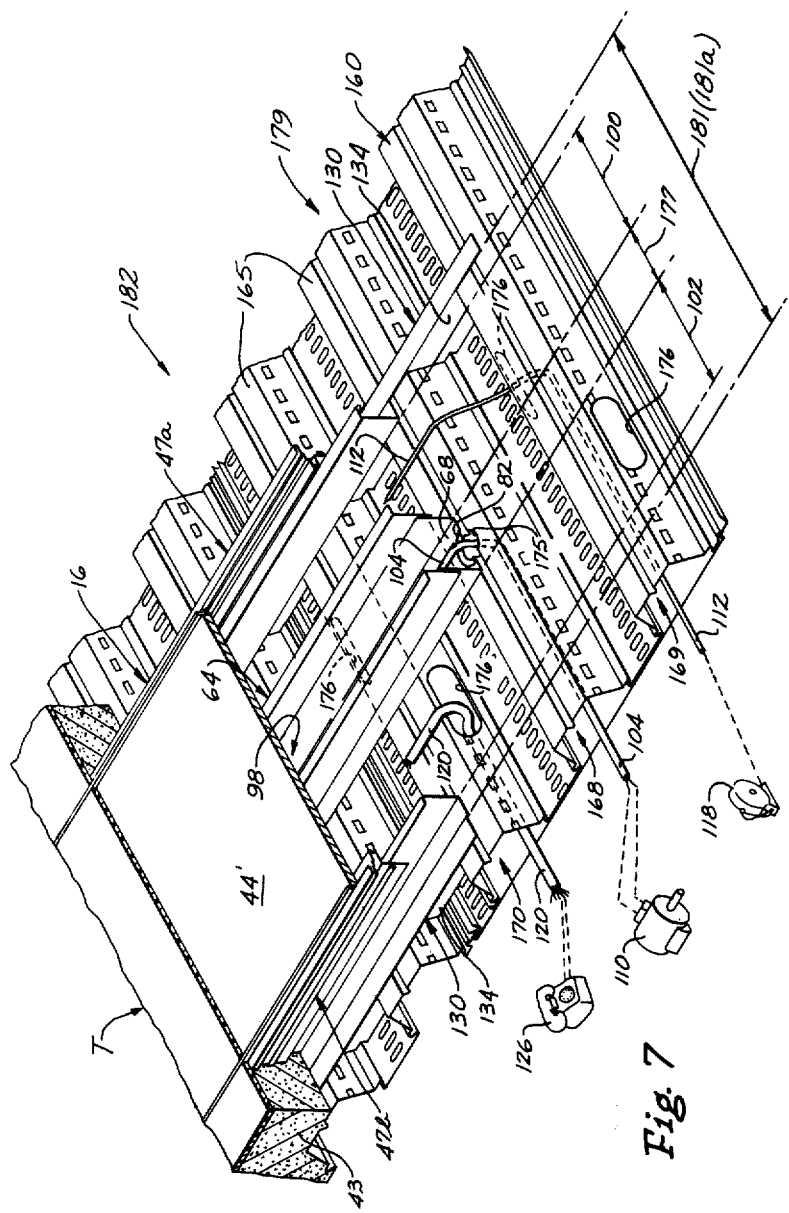
FIG. 7 is a fragmentary isometric view illustrating a floor structure incorporating a metal cellular flooring unit of this invention and a bottomless electrical cable trench-forming sub-assembly.

FIG. 7 illustrates a floor structure 182 incorporating the metal subfloor 179 and a bottomless electrical cable trench-forming sub-assembly 16. For a complete description of the trench-forming sub-assembly 16 reference is directed to U.S. Pat. No. 3,721,051. However, for the purposes of this invention it is believed sufficient to state that the trench-forming sub-assembly 16 includes opposite sides 47a, 47b, each independently anchored in the concrete 43 and fixed spaced-apart relationship and a cover plate 44' spanning the distance between the opposite sub-assembly sides 47a, 47b. The sub-assembly 16 extends transversely across the crests 165 of the metal subfloor 179 and is bottomless, whereby the upper surface portion of the metal subfloor 179 in the transverse region 181 of the metal subfloor 179 between the opposite sub-assemblies sides 47a, 47b cooperates with the sub-assembly 16 to create an underfloor electrical cable trench T. The sub-assembly 16 also is provided with an enclosed raceway 64 disposed between the opposite sub-assembly sides 47a, 47b and extending downwardly from the cover plate 44. The enclosed raceway 64 includes a bottom wall 68 provided with longitudinally spaced wall openings 82 (only one illustrated) which expose the crests of the metal subfloor 179. It willl be observed in FIG. 7 that the crest access opening 175 of the flooring unit 160 is disposed within one of the wall openings 82 of the enclosed raceway 64.

As can be seen in FIG. 7, the width of the enclosed raceway 64 corresponds to the transverse region 177 of the flooring unit 160. Moreover, the transverse region 181 of the metal subfloor 179 may correspond to a width (hereinafter identified) of the trench-forming sub-assembly 16. Consequently, the crest access openings 175 and the web access openings 176 are presented entirely within the confines of the trench-forming sub-assembly 16. It will be appreciated that in the metal subfloor 179, each or selected ones of the metal cellular units 160 may be provided with the access openings 175 and 176, as desired.

Trench-forming sub-assemblies presently are provided in widths of from 9 up to 36 inches. Trench-forming sub-assemblies having widths of up to 48 inches are presently being considered. As a standard industry practice, the specified trench width corresponds to the width W' (FIG. 8) of the cover plate. However, it will be observed in FIGS. 7 and 8 that the transverse region 181 (181a) has a width corresponding to the distance between the vertically present closure elements 134 of the closure means 130. Hence the transverse region 181 (181a) corresponds to that upper surface area of the metal cellular flooring unit 160 which constitutes the bottom of the underfloor electrical cable trench T. As hereinabove defined, the width of the transverse region 181 (181a) exceeds the trench width W' by a relatively small increment. The transverse region 181 (181a) may have a width of up to about 50 inches.

The enclosed raceway 64 provides a central passageway 98, and in addition, divides the interior of the trench-forming sub-assembly 16 into lateral passageways 100, 102. The central passageway 98 accommodates high voltage power conductors, such as the conductor 104, which extends through the central passageway 98, downwardly through the crest access opening 175, into the central cell 168, and is connected, for example, to a motor schematically illustrated at 110. The lateral passageway 100 accommodates auxiliary wiring such as the wiring 112 which extends through the lateral passageway 100, through the web access opening 176 into the lateral cell 169 and is connected, for example, to an alarm schematically illustrated and 118. The lateral passageway 102 accommodates low voltage telephone wiring such as the telephone cable 120 which extends through the lateral passageway 102, through the web access opening 176 into the second lateral cell 170 and has a pair of its many strands connected, for example, to a telephone schematically illustrated at 126. It will be appreciated that the enclosed raceway 64 serves to segregate the high voltage power conductor 104 from the low voltage auxiliary and telephone wiring 112, 120. Moreover, the auxiliary and telephone wiring 112, 120 are themselves essentially segregated.

It will be observed in FIG. 8 that the width W' of the cover plate 44' is determined by the distance between the sub-assembly sides 47a, 47b. Each of the sides 47a, 47b includes, in part, sub-rails 50 having lower horizontal flanges 56 overlying the crests 165 of the subfloor 179. Closure means in the form of angle members 130 which substantially entirely fill the troughs 174 prevent ingress of the subsequently poured concrete into the troughs 174. Each angle member 130 includes an upper horizontal flange 132 abutting the lower horizontal flange 56 of the sub-rail 50 and vertically presented closure elements 134.

In accordance with the present invention, the remote ends 176a, of the web access openings 176 underly the horizontal flanges 56, 132 of the sub-rail 50 and the angle member 130. It will be appreciated in FIG. 8 that if access openings having the same dimensions as the access openings 176 were presented in the crests 165, the sub-assembly sides 47a, 47b would have to be disposed in the positions illustrated in dotted outline. It will be observed that the width W of the cover plate spanning between the dotted outline position of the sides 47a, 47b is greater than the width W' of the cover plate 44'. Consequently, the access opening arrangement of this invention achieves a significant reduction in the width and, hence, in the amount of material required for the cover plate 44'. The reduced spacing of the sides 47a, 47b is made possible by locating the access openings 176 in the webs 167.

It will also be observed in FIG. 8 that other than the crest access opening 175, the crests 165 of the cells 168, 169, 170 are otherwise imperforate. Consequently, enclosed raceways having widths greater than that of the enclosed raceway 64 may be incorporated into the sub-assembly 16 without significantly impeding access to the web access openings 176 and the interiors of the cells 169, 170.

It will also be appreciated in FIG. 8 that the vertical adjustment capability of the sub-assembly 16 and of the enclosed raceway 64 provide a convenient means by which the wire carrying capacity (cross-sectional area) of the passageways 98, 100 and 102 may be selected to correspond to the predicted wire density.

I claim:

1. In a metal cellular flooring unit comprising a corrugated upper metal sheet presenting alternating crests and valleys and webs connecting adjacent ones of said crests and said valleys, and a correlative lower metal sheet secured to said upper metal sheet along contiguous portions thereof and cooperating therewith to define spaced-apart generally parallel enclosed cells; and marginal connecting means along the opposite longitudinal sides of said flooring unit adapting said flooring unit for interconnection with other flooring units; the improvement comprising:

said flooring unit having a transverse region intermediate of its ends, said transverse region having a width of up to about 50 inches;

said flooring unit having a single crest access opening and at least one web access opening residing within said transverse region;

said crest access opening being formed solely in the crest of a first cell and establishing communication between the interior of said first cell and the space above said flooring unit, said crest access opening constituting the only useful access opening in said first cell within said transverse region; and said web access opening being formed solely in one web of a second cell and establishing communication between the interior of said second cell and the space above the valley adjoining said one web.

2. The improvement of claim 1 wherein:

the other web of said second cell has a second web access opening establishing communication between the interior of said second cell and the space above the valley adjoining said other web, said second web access opening residing within said transverse region and being formed solely in the other web of said second cell.

3. The improvement of claim 2 wherein:

the first said web access opening and said second web access opening reside on opposite sides of said crest access opening.

4. The improvement of claim 1 wherein:

one web of a third cell has a second web access opening establishing communication between the interior of said third cell and the space above the valley adjoining said one web of said third cell, said second web access opening residing within said transverse region and being formed solely in one web of said third cell.

5. The improvement of claim 4 including:

additional web access openings, one for said second cell and one for said third cell, said additional web access openings establishing communication between the interior of the cell and the space above the adjacent valley, said additional web access openings residing within said transverse region and being formed solely in the other webs of said second cell and said third cell.

6. The improvement of claim 5 wherein:

the first said web access opening, said second web access opening, and said additional web access openings are staggered on opposite sides of said crest access opening.

7. The improvement of claim 5 wherein:

all of the web access openings reside on the same side of said crest access opening.

8. The improvement of claim 1 wherein:

the valley which adjoins said one web of said second cell also adjoins a web of said first cell.

9. The improvement of claim 1 wherein:

the valley which adjoins said one web of said second cell resides on that side of said second cell remote from said first cell.

10. The improvement of claim 1 wherein:

said web access opening is offset with respect to said crest access opening, longitudinally along said flooring unit.

11. In an electrical wiring distributing floor structure including a metal subfloor and an overlying layer of concrete; said metal subfloor presenting alternating crests and valleys and including metal cellular units providing generally parallel enclosed cells, each presenting a crest and included webs depending from opposite sides of said crest; a sub-assembly extending transversely across said crests of said metal subfloor and being bottomless, whereby the upper surface portion of said metal sub-floor in the region between said opposite sub-assembly sides cooperates with said sub-assembly to create an underfloor electrical cable trench, said sub-assembly including spaced-apart opposite sides and a cover plate spanning the distance between said opposite sub-assembly sides; and an enclosed raceway extending downwardly from said cover plate between said opposite sub-assembly sides, said enclosed raceway including a bottom wall having longitudinally spaced wall openings exposing said crests; the improvement in said metal cellular flooring units comprising:

the crest of a first cell of selected metal cellular units having a crest access opening disposed within one of said wall openings of said enclosed raceway, said crest access opening establishing communication between the interior of said first cell and the interior of said enclosed raceway; and one web of a second cell of said selected metal cellular units having a web access opening establishing communication between the interior of said second cell and the interior of said electrical cable trench other than the interior of said enclosed raceway.

12. The improvement of claim 11 wherein:

the crest of said second cell is substantially imperforate in that region thereof residing between said opposite sub-assembly sides.

13. The improvement of claim 11 wherein:

said web access opening is substantially entirely laterally offset from said crest access opening and has an end portion thereof remote from said crest access opening, which underlies one of said opposite sub-assembly sides.

14. The improvement of claim 11 wherein:

one web of a third cell has a second web access opening establishing communication between the interior of said third cell and the interior of said electrical cable trench other than the interior of said enclosed raceway; and the first said web access opening and said second web access opening reside on opposite sides of said crest access opening and have end portions thereof remote from said crest access opening, underlying said opposite sub-assembly sides.

15. The improvement of claim 11 wherein:

said web access opening is substantially entirely laterally offset from said crest access opening.

16. The improvement of claim 11 wherein:

one web of a third cell has a second web access opening establishing communication between the interior of said third cell and the interior of said electrical cable trench other than the interior of said enclosed raceway.

17. The improvement of claim 16 wherein:

the first said web access opening and said second web access opening reside on opposite sides of said crest access opening.

18. The improvement of claim 16 including:

additional web access openings, one in each other web of said second cell and said third cell, establishing communication between the interiors of said second cell and said third cell and the interior of said electrical cable trench other than the interior of said enclosed raceway.

19. The improvement of claim 18 wherein:

the first said web access opening, said second web access opening, and said additional web access openings are staggered on opposite sides of said crest access opening.

20. The improvement of claim 18 wherein:
all of the web access openings reside on the same side of said crest access opening.

21. The improvement of claim 11 wherein:
the other web of said second cell has a second web access opening establishing communication, between the interior of said second cell and the interior of said electrical cable trench other than the interior of said enclosed raceway.

* * * * *